Aug. 16, 1955   A. ARUTUNOFF   2,715,344
PLANETARY GEAR TRANSMISSION FOR DRILLING APPARATUS
Original Filed Oct. 15, 1949
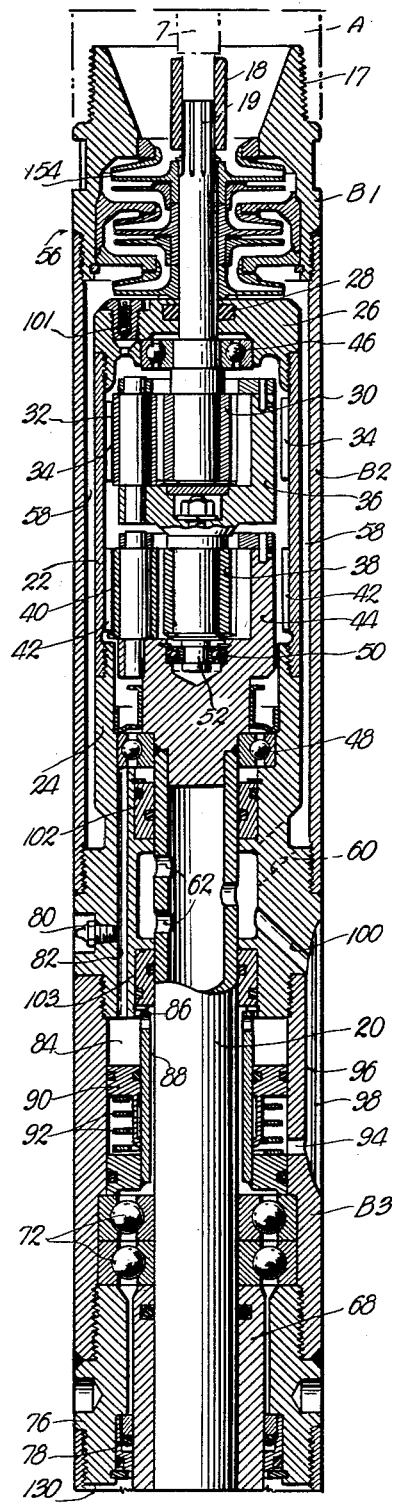
INVENTOR.
Armais Arutunoff
BY
Thos. E. Scofield
ATTORNEY.

United States Patent Office 2,715,344
Patented Aug. 16, 1955

2,715,344

PLANETARY GEAR TRANSMISSION FOR DRILLING APPARATUS

Armais Arutunoff, Bartlesville, Okla.

Original application October 15, 1949, Serial No. 121,579. Divided and this application May 18, 1951, Serial No. 227,047

1 Claim. (Cl. 74—801)

The present invention relates in general to the drilling of oil wells, and it deals more particularly with an improvement in a drilling tool of the type shown in my co-pending applications Serial Nos. 711,959, filed November 23, 1946, now Patent No. 2,609,182, and 60,709 filed November 18, 1948, now Patent No. 2,662,735. The present application is a division of my copending application Serial No. 121,579 filed October 15, 1949, now Patent No. 2,654,572.

The object of the invention is to provide an improved form of reduction gearing and means for sealing the same against intrusion of drilling fluid or other foreign matter. To this end I employ multi-stage planetary gearing and a novel arrangement for maintaining the successive stages in proper working relationship.

Other and further objects of the invention, together with the structural features of novelty whereby the objects are achieved, will appear in the course of the following description of the invention.

In the accompanying drawings which form a part of the specification and are to be read in conjunction therewith, the figure is a longitudinal cross section including the planetary gearing in the lower portion of a drilling unit.

The construction is provided with a downwardly extending motor shaft 7 connected by means of a splined coupling 18 to the pinion shaft 19 which drives a vertically aligned hollow shaft 20 through multi-stage planetary gearing now to be described.

The latter gearing is enclosed in a stationary housing 22 spaced inwardly from the shell B2 and supported by the connecting frame member 24 which also serves to form the lower end of the inner housing. The upper end of the said housing is closed by a cap 26 through which shaft 19 enters, the entrance being sealed by packing 28 around the shaft.

The first stage of planetary gearing comprises a sun gear 30 on the lower end of shaft 19 and a plurality of planet gears 32 meshing with the sun gear and also with the internal teeth 34 of a ring gear formed integral with the housing 22. The planet gears, arranged in a circle about the sun gear in conventional fashion, are carried by a yoke 36 which has a downwardly extending shaft on which is fixed the sun gear 38 of the second stage of planetary gearing.

The second stage is like the first in that it has planet gears 40 meshing with the sun gear 38 and also with teeth 42 of a ring gear formed on the inside of housing 22. The planet gears of the second stage are carried by yoke 44 which has downwardly extending stub connected to the hollow shaft 20 for driving same.

As will readily be understood by those versed in the art, rotation of the sun gear 30 causes planet gears 32 to travel in an orbit around the sun gear, turning yoke 36 and gear 38 at reduced speed. Gear 38 in turn causes planet gears 40 to travel in an orbit and rotate yoke 44 and shaft 20 at still slower speed.

The high speed driving shaft 19 is supported by a bearing 46, and the low speed driven shaft 20 by a bearing 48. An important feature resides in the provision of a bearing 50 to which the lower end of the intermediate speed shaft (i. e., the downwardly extending shaft of yoke 36) is secured by a bolt 52. Except for this arrangement, the upper yoke 36 would be perfectly free to shift axially relative the lower yoke and also relative the upper sun gear 30, a situation which would give rise to deleterious bouncing, hammering and excessive wear on the parts; but this is prevented by the tying of the two yokes together as regards their vertical spacing, the arrangement nevertheless permitting the yokes to turn at different ring speeds as is required in their normal operation.

Affixed to shaft 19 are the impellers 54 of a multi-stage centrifugal pump 56. In operation, this pump draws liquid from the space in the well surrounding the unit. After passing through pump 56, the fluid is discharged under pressure into the annular space 58 around housing 22 and flows through ducts 60 and apertures 62 into the hollow shaft 20.

For lubrication and protection of the bearings thus far described, as well as of the planetary gearing and associated parts, the housing 22 is filled with lubricating oil or light grease introduced through nipple 80. This nipple communicates with a duct 82 through which the lubricant may flow upwardly through and around bearing 48, through and around the planetary gearing, filling the housing completely to the top cap 26. Duct 82 also leads downwardly to a piston chamber 84 which in turn, through apertures 86, communicates with the annular space 88 around shaft 20, and hence with the bearings 72.

Piston 90 in said chamber is urged upwardly by a coiled compression spring 92 supplemented by the pressure of fluid admitted behind the piston through aperture 94. The latter aperture connects with a chamber 96 formed on the exterior of the tool by a shallow recess covered by plate 98, this chamber being connected by a duct 100 with the fluid passageway maintained under pressure by the discharge of centrifugal pump 56.

From the foregoing it will be seen that this invention is one well adapted to attain all of the ends and objects hereinbefore set forth, together with other advantages which are obvious and which are inherent to the apparatus.

It will be understood that certain features and sub-combinations are of utility and may be employed without reference to other features and sub-combinations. This is contemplated by and is within the scope of the claim.

Inasmuch as many possible embodiments of the invention may be made without departing from the scope thereof, it is to be understood that all matter herein set forth or shown in the accompanying drawings is to be interpreted as illustrative and not in a limiting sense.

Having thus described my invention, I claim:

A multi-stage planetary power transmission between a driving shaft and a coaxial driven shaft comprising a yoke connected to one of said shafts and carrying planet gears, a second yoke coaxial with said first yoke carrying planet gears and also carrying a sun gear meshing with said first planet gears, an axial passageway through said second yoke, an axial bolt extending through said passageway and having one end extending past the end of the sun gear on said second yoke into a socket formed in the adjacent face of said first yoke, a thrust bearing in said socket secured respectively to said socket and to the end of the bolt, stop means on the other end of said bolt bearing against said second yoke, said bolt, stop means and thrust bearing locking said yokes together against relative axial movement, a sun gear carried by the other shaft meshing with the planet gears carried by said second yoke, and a stationary reaction orbit gear in mesh with each of said planet gears.

References Cited in the file of this patent

UNITED STATES PATENTS

| | | |
|---|---|---|
| 936,870 | Duntley et al. | Oct. 12, 1909 |
| 2,186,064 | Dekker | Jan. 9, 1940 |
| 2,286,236 | Scott | June 16, 1942 |
| 2,460,629 | Fawick | Feb. 1, 1949 |
| 2,497,659 | Davis et al. | Feb. 14, 1950 |
| 2,552,859 | Nardone | May 15, 1951 |